(12) United States Patent  
Boyer et al.

(10) Patent No.: US 7,521,027 B2  
(45) Date of Patent: Apr. 21, 2009

(54) CATALYTIC FIXED-BED REACTOR COMPRISING BYPASS MEANS FOR FLOWS THROUGH THE BED

(75) Inventors: Christophe Boyer, Charly (FR); Abdelhakim Koudil, Lyons (FR)

(73) Assignee: Institut Francais Due Petrole, Rueil Malmaison Cedex (FR)

( * ) Notice: Subject to any disclaimer, the term of this patent is extended or adjusted under 35 U.S.C. 154(b) by 526 days.

(21) Appl. No.: 11/236,693

(22) Filed: Sep. 28, 2005

(65) Prior Publication Data

US 2006/0067858 A1    Mar. 30, 2006

(30) Foreign Application Priority Data

Sep. 28, 2004    (FR) .................................. 04 10286

(51) Int. Cl.
  *B01J 8/04*   (2006.01)
  *B01J 10/00*  (2006.01)
  *B01J 8/02*   (2006.01)
  *B01J 35/02*  (2006.01)
  *G05D 16/00*  (2006.01)

(52) U.S. Cl. ...................... 422/190; 422/191; 422/112; 422/105; 422/211; 422/220; 261/148

(58) Field of Classification Search ................. 422/112, 422/211, 105, 220, 190, 191; 261/148
  See application file for complete search history.

(56) References Cited

U.S. PATENT DOCUMENTS

| | | | | |
|---|---|---|---|---|
| 2,386,846 A | * | 10/1945 | Dunham | 208/169 |
| 3,498,752 A | | 3/1970 | Kuo | |
| 3,598,539 A | * | 8/1971 | Pizzato | 422/220 |
| 3,607,000 A | * | 9/1971 | Beal et al. | 423/659 |
| 4,140,625 A | * | 2/1979 | Jensen | 208/146 |
| 5,939,031 A | | 8/1999 | Ellis et al. | |
| 5,942,197 A | * | 8/1999 | Gupta et al. | 422/191 |
| 2002/0081249 A1 | | 6/2002 | Gupta et al. | |

* cited by examiner

*Primary Examiner*—Walter D Griffin  
*Assistant Examiner*—Natasha Young  
(74) *Attorney, Agent, or Firm*—Millen, White, Zelano, Branigan, P.C.

(57) ABSTRACT

The invention relates to a device for circulation of a gaseous and/or liquid fluid through at least one solid particle bed equipped with at least one bypass means acting on at least one part of said fluid through at least one part of a solid particle bed, said bypass means comprising:
  a pipe whose top end discharges above the upper surface of the catalyst bed and whose bottom end discharges below said surface, and
  a valve that is made to be actuated in the open position when the differential pressure through the solid particle bed is greater than a predetermined value, said valve including means allowing the automatic variation of the passage section of the fluid based on the fluid flow rate.

19 Claims, 7 Drawing Sheets

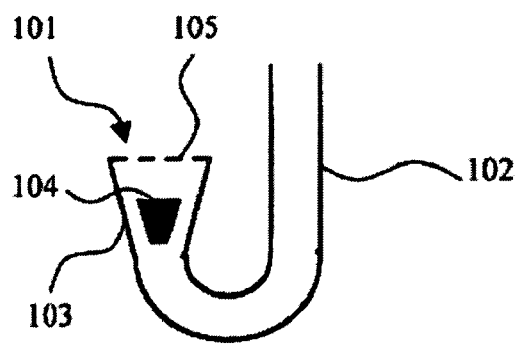
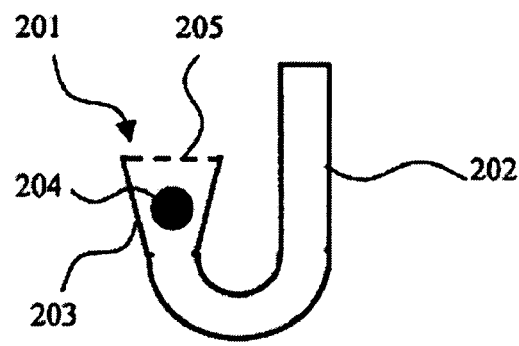
Figure 4
Figure 5
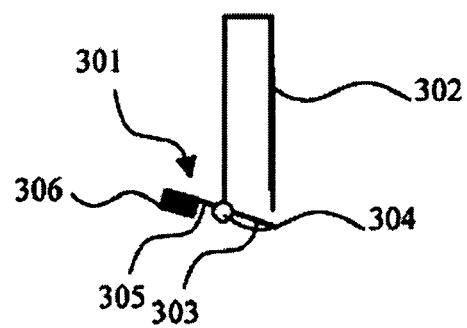
Figure 6

[Key to Figure 7:]
lit = Bed
totale = Total
Temps = Time
(1bar=0,1 MPa) = (1 bar = 0.1 MPa)

CATALYTIC FIXED-BED REACTOR COMPRISING BYPASS MEANS FOR FLOWS THROUGH THE BED

FIELD OF THE INVENTION

The invention relates to the field of device comprising at least one solid particle bed through which a liquid and/or gaseous fluid is made to flow. This field encompasses, in particular, that of reactors in which reactants, in liquid and/or gaseous form, pass through one or more fixed catalyst beds.

The invention is especially well suited for devices in which the solid particle beds have a tendency to clog and lead to pressure losses that can become prohibitive, even as far as shutdown of the device, if a bypass means is not implemented.

PRIOR ART

U.S. Pat. No. 3,796,655 describes a process in which a fluid of reagents containing solid particles passes through a catalyst bed, said solids progressively forming a crust at the entry to the bed and thus increasing the differential pressure through said bed. In the case in which the differential pressure of the bed would exceed a certain threshold, a pipe equipped with means sensitive to an increase of the differential pressure, such as a rupture disk, is used to inject a flow of fluid within the catalyst bed downstream from the crust that has been formed in this way. Such a process has the disadvantage of causing sudden variations of the flow rate of reagents and of the differential pressure through the bed; this can adversely affect the optimum use of the catalyst. On the other hand, sudden variations of pressure during the operation of these processes can likewise start the flow of the fluid into the pipe in an ill-timed and non-reversible manner.

U.S. Pat. No. 5,939,031 describes a reactor for reacting a liquid with a treatment gas in the presence of a catalyst, the gas and the liquid flowing in countercurrent. The reactor includes a catalyst bed topped by a disk for distribution of the liquid that flows downward as well as a bypass device of this bed to allow a part of said liquid to be diverted. The bypass device is provided with regulation means to regulate the amount of liquid diverted by this device. The bypass device likewise includes a pipe comprising an upper section in fluidic communication with liquid that has accumulated on the distribution plate in such a way as to form a watertight closure, and a lower section provided with a valve to prevent any rising of gas into the bypass device when liquid does not pass through it. The regulation means of the bypass device are implemented based on the level of liquid in the distribution plate when the bed is clogged, and the liquid flow is accomplished by the siphon effect between a high level of the liquid initiating said effect and a low level of the liquid terminating this siphon effect; this thus allows regulation of the amount of diverted liquid. As long as the bed is not clogged, even if the pressure difference increases, the bypass device does not start.

The disadvantage of the technologies of the prior art is that their use tends to generate major variations of the flow rate and/or of the pressure through the solid particle bed. These variations can generate instabilities, more or less periodic, or sudden stoppages of the fluid flow through the bed.

SUMMARY DESCRIPTION OF THE INVENTION

The main object of the invention is to provide bypass means (by-pass according to English terminology) of a solid particle bed allowing part of the fluid flow to be diverted when the differential pressure through said bed exceeds a given threshold and allowing continuous regulation of the flow rate of this fluid in the bypass device and/or the differential pressure through the bed.

The invention thus relates to a device for circulation of gaseous and/or liquid fluid through at least one solid particle bed equipped with at least one bypass means including a pipe whose top end discharges above the upper surface of the catalyst bed and whose bottom end discharges under said surface, and a valve that is made to be actuated in the open position when the differential pressure through the solid particle bed is greater than a predetermined value. Relative to the installations of the prior art, the valve of the bypass device includes means that allow automatic variation of the passage section of the fluid in said valve based on the fluid flow rate.

BRIEF DESCRIPTION OF THE FIGURES

FIGS. 4 to 6 show, in a nonlimiting manner, embodiments of the valve of the bypass means according to the invention.

FIG. 7 corresponds to a device according to the invention. FIGS. 8 and 9 correspond to devices according to the prior art.

DETAILED DESCRIPTION OF THE INVENTION

Figure 1:
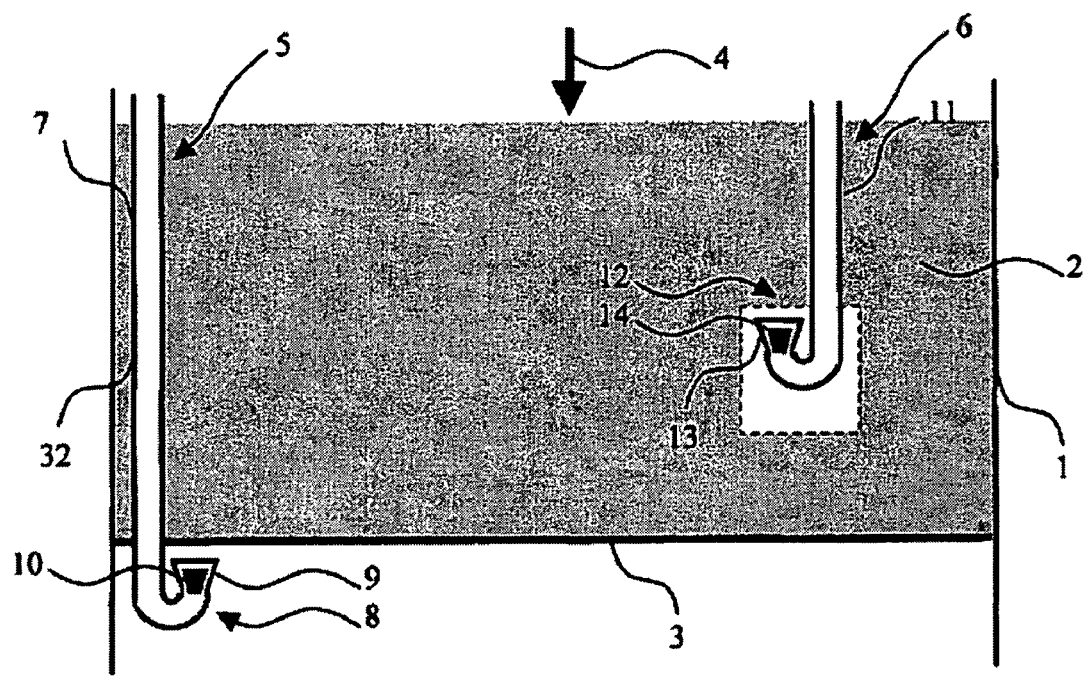
FIG. 1 shows, in a nonlimiting manner, one embodiment of the device of the invention comprising an enclosure, a granular bed and two bypass devices that bypass all or part of the bed.

One object of the invention is thus to provide a device for circulation of a gaseous and/or liquid fluid through at least one solid particle bed equipped with at least one bypass acting on at least one part of said fluid through at least one part of a solid particle bed, said bypass means comprising:
  a pipe whose top end discharges above the upper surface of the catalyst bed and whose bottom end discharges under said surface, and
  a valve that is made to be actuated in the open position when the differential pressure through the solid particle bed is greater than a predetermined value.

In the device according to the invention, the valve includes means allowing the automatic variation of the passage section of the fluid in said valve based on the fluid flow rate.

The means allowing automatic variation of the passage section of the fluid in the valve of the bypass means based on the flow rate can advantageously be means of a mechanical type. These means can likewise incorporate control components, connected to the valve, for example electrical control components, allowing control of the latter outside of the device of the invention. These means can, moreover, include components for measuring the fluid flow rate through the valve and can be integrated into a regulation loop.

These means can thus comprise any control component and/or regulation component known to one skilled in the art.

More exactly, the means allowing automatic variation of the passage section of the fluid in the valve based on the flow rate of said fluid can be such that the passage section A of the valve and the flow rate, Q, through said valve vary in such a way that the ratio $$\frac{A}{Ao} * \frac{Q}{Qo}$$

is between 0.1 and 10, Ao and Qo corresponding respectively to the passage section and to the nominal flow rate of the valve.

According to one preferred embodiment, the valve of the bypass means includes:
- a widened tubular part whose orifice having the smallest cross-section is connected to one end of the pipe of the bypass device,
- a movable piece mounted in said widened tubular part in such a way as to allow displacement between a closed position and a maximum open position, the positioning of the movable piece being dependent on the fluid flow rate in said widened tubular part, and
- a return means acting on the movable piece to move it toward the closed position in which the movable piece blocks the orifice of the widened tubular part with the smallest cross-section.

Preferably, the return means acts by the force of gravity of the movable piece.

In this case, the return means can be inherent in the positioning of the widened tubular part and in the weight of the movable piece. More exactly, the return means can be inherent in the elevation of the orifice with the largest cross-section of the widened tubular part above the orifice with the smallest cross-section of said part. Thus, in this case, the movable piece, moreover, throughout has its own weight and, due to the positioning of the widened part, the function of a return means.

The return means can likewise include or can essentially consist of a spring.

In order to optimize the watertight nature of the valve in the closed position, the widened tubular part and the movable piece can assume any shape allowing the movable piece in the closed position to work with the widened tubular part for accomplishing this watertightness. Preferably, the widened tubular part has the shape of a truncated cone, and the movable piece has the shape of a ball or truncated cone.

According to another preferred embodiment, the valve of the bypass means includes:
- at least one plate mounted to be able to move around one axis on one end of the pipe of the bypass means in such a manner as to allow displacement between a closed position and a maximum open position, the positioning of said plate being dependent on the fluid flow rate in the bypass means, and
- a return means acting on the plate or plates for moving it toward the closed position during which the plate or plates blocks or block the end of the pipe.

In this other embodiment, the return means can preferably include a rod in the extension of the plate and a mass located on the free end of the rod and acting as a counterweight relative to the axis of mobility of the plate.

The bypass means can be positioned differently relative to the solid particle bed. The positions of the bottom and top ends of the pipe of the bypass means can be decisive for the use of said bypass means.

According to one embodiment of the invention, the bottom end of the pipe of the bypass means discharges under the solid particle bed. This positioning makes it possible to divert a minimum quantity of fluid, regardless of the size of the clogged bed volume.

Alternately, the bottom end of the pipe of the bypass means can discharge into the solid particle bed, said end being provided with a means that prevents passage of solid particles into said pipe. This positioning of the bottom end has the advantage of ensuring a minimum level of placing the fluid into contact with the solid particles of the bed. This embodiment is of particular advantage when clogging takes place in principle and first at the upper level of the bed. Bypass means whose bottom ends discharge at different levels in the solid particle bed can allow optimization of fluid contact with said solid particles as and when this bed clogs.

In this alternate embodiment in which the bottom end of the pipe of the bypass means discharges into the solid particle bed, the means preventing the passage of solid particles can be any means known to one skilled in the art. Preferably, the means preventing the passage of solid particles into the pipe of the bypass means includes, preferably, a cage that has perforated walls and that closes the bottom end of said pipe.

The device of the invention can be used regardless of the direction of flow of the fluid or fluids. Thus, it is possible to envision flow of a gaseous fluid and a liquid fluid, i.e., a two-phase flow, in the same direction, i.e., a co-current flow, or in opposite directions, i.e., a countercurrent flow.

According to another embodiment of the invention, the solid particle bed is topped by a distribution plate comprising a plate above which a liquid fluid accumulates and the top end of the pipe of the bypass means discharges above said plate. The distribution plate above the bed generally allows a uniform distribution of liquid fluid flowing toward the base to be obtained over the entire upper surface of the bed.

In a first case, the top end of the pipe of the bypass means can discharge at the same level as the upper surface of the plate of the distribution plate. In this case, at least one part of the liquid fluid flowing above the distribution plate is systematically sent into the bypass means.

In a second case, the top end of the pipe of the bypass means can discharge at a height H relative to the upper surface of the plate of the distribution plate. In this case, the liquid fluid flow into the bypass means begins starting at the instant at which the liquid fluid level accumulated in the distribution plate exceeds the height H at which the top end of said bypass pipe discharges relative to said plate.

According to one downward co-current flow mode, the device in which a gaseous fluid and a liquid fluid circulate through at least one solid particle bed in a downward direction comprises:
- at least a first bypass means discharging at the same level as the upper surface of the plate of the distribution plate, and
- at least a second bypass means discharging at a higher level relative to a maximum level of liquid fluid that has accumulated in the distribution plate.

This embodiment makes it possible to separate the flow of the two liquid and gaseous fluids into two separate bypass means. In this embodiment, the first and the second bypass means are respectively intended for bypass of the liquid fluid and the gaseous fluid.

According to another embodiment, the device is implemented with a countercurrent flow, i.e., a device in which a gaseous fluid and a liquid fluid circulate in countercurrent through at least one solid particle bed.

The device can comprise several particle beds. Preferably, a plurality of solid particle beds is used and at least one of said beds is equipped with at least one bypass means of at least part of a fluid through at least one part of said solid particle bed.

DETAILED DESCRIPTION OF THE FIGURES

For better understanding, several embodiments of the device of the invention are illustrated by FIGS. 1 to 9. These embodiments are given by way of example and are not limiting. These illustrations of the device of the invention do not include all of the components necessary for its implementation. Only the elements necessary to the understanding of the invention are shown there, one skilled in the art being able to complete these representations for implementing and using the invention.

FIG. 1 shows one embodiment of the device of the invention including an enclosure 1, shown in part, in which there is a granular bed 2. This bed is composed of all the solid particles retained by a support grid 3. The bed can include, for example, catalyst grains in the case of a reactor used for chemical processes implementing a heterogeneous catalytic reaction. The granular bed is traversed by a downward flow of gas shown by the arrow 4.

The device includes a bypass means 5 that passes through the bed 2 over its entire height and a bypass means 6 that passes through the bed 2 over only one part of its height.

The bypass means 5 includes a pipe 7 whose bottom end includes a valve 8 allowing the opening of the tube to be blocked or progressively allowing passage to a flow. The valve 8 includes a truncated cone part 9 whose orifice with the smallest cross-section is connected to the bottom end of the pipe 7 of the bypass device 5, and a movable piece 10 mounted in said truncated cone in such a manner as to allow displacement between a closed position and a maximum open position.

In the same way, the bypass means 6 comprises a pipe 11, a valve, said valve including a truncated cone part 13 and a movable piece 14. In this embodiment, the bottom parts of the pipes of each bypass means have the shape of a "U" that allows orientation of the orifice of the truncated cone part with the largest cross-section toward the top, the return means thus acting by the sole force of gravity inherent in the weight of the movable piece.

The bypass means 6 on its bottom end includes a cage 12 with perforated walls to promote contact of the gas with the part of the granular bed around this bottom end of the bypass means 6.

In normal operation, the bypass means 5 and 6 are closed and the movable pieces 10 and 14 block the entire passage section of the pipes 7 and 11. When the particles come to block the interstices of the granular bed 2 during operation, the differential pressure through the bed increases. When this differential pressure reaches a given value, called the threshold value, one part of the flow will be diverted by the bypass means 5 and 6. The upstream pressure in the bypass means thus becomes enough to compensate for the weight of the movable pieces 10 and 14. It is thus possible to regulate the threshold value of the differential pressure by choosing the mass of the movable pieces 10 and 14. The total passage section offered by the pipes 7 and 11 of the bypass means 5 and 6 must be enough for the differential pressure caused by the friction on the internal surface of the pipes during flow in these pipes to be much less than the threshold differential pressure. As and when the differential pressure through the bed 2 increases, the pressure equilibrium between the inlet and outlet of the catalyst bed causes the flow to be diverted by the bypass means. The increase of the pressure in the bypass means 5 and 6 produces the rise of the movable pieces 10 and 14 in the conical cross-section tube in such a way as to allow a greater passage section for the flow, while opposing an almost constant pressure force since it corresponds essentially to the force necessary to keep the movable pieces in the "floating" position. In this way, the bed 2 continues to be traversed without a significant additional increase of the differential pressure. Thus, the reactor can continue to operate until the bed is completely clogged.

Figure 2:
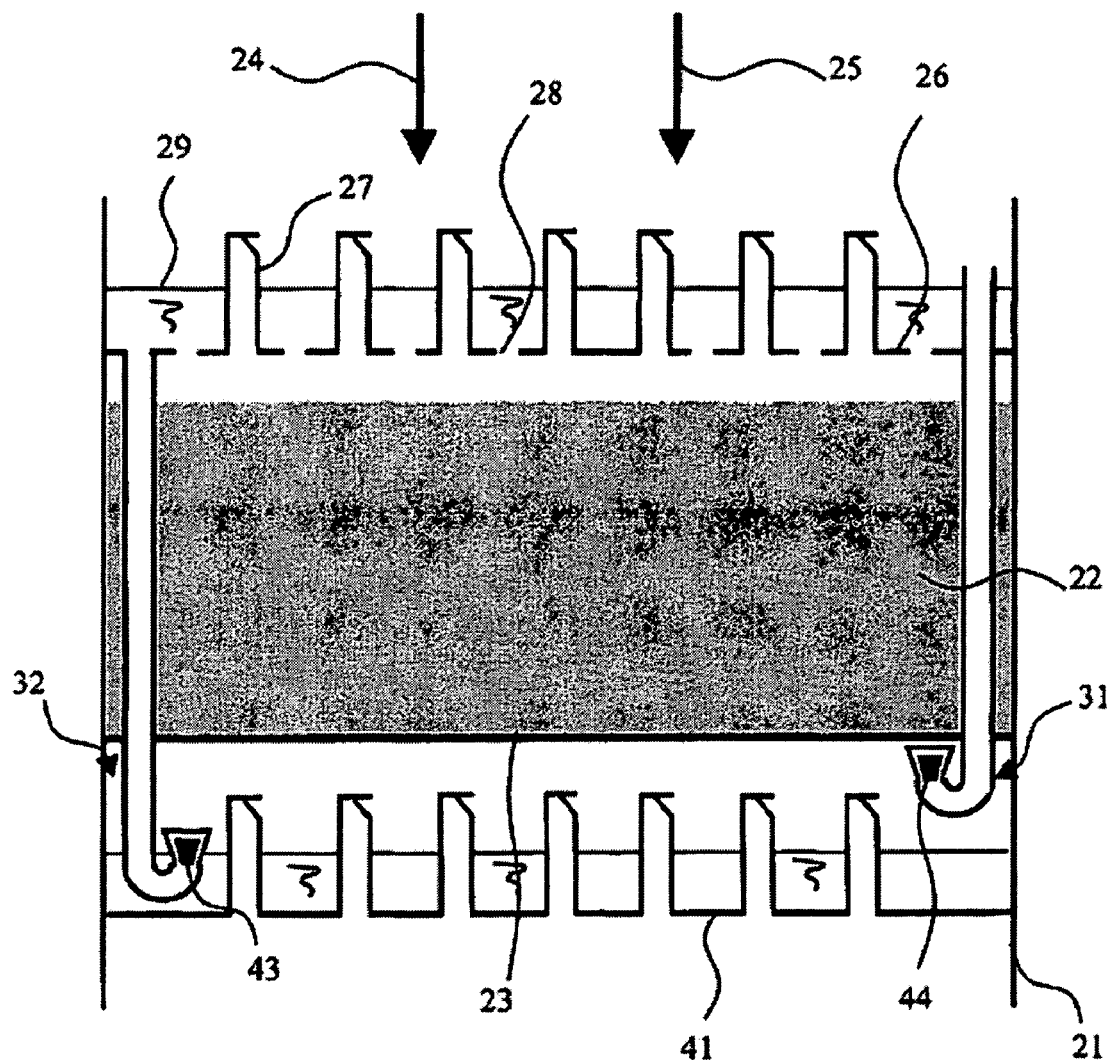
FIG. 2 shows, in a nonlimiting manner, another embodiment of the device of the invention in which there is a downward two-phase flow of gas and liquid.

FIG. 2 shows another embodiment of the device of the invention in which it is in the presence of a downward two-phase flow of gas and liquid.

This embodiment includes an enclosure 21, shown in part, in which there is a granular bed 22. This bed is composed of all the solid particles retained by a support grid 23. The granular bed is traversed by a liquid flow and a gaseous flow shown by the arrows 24 and 25. The device includes a distribution plate 26 located upstream from the granular bed. This plate makes it possible to distribute the liquid and gas flow over the entire cross-section of the granular bed. This distribution plate in this case includes tubes 27 for passage of the gas and orifices 28 for passage of the liquid. A liquid level 29 is established above the plate 26 in such a way as to uniformly feed all the orifices 28.

Since the granular bed 22 located downstream from the plate 26 is susceptible to clogging during its operation, two bypass means 31 and 32 are installed through the granular bed to alleviate this problem. The means 31 discharges above the highest liquid level and thus allows the gas flow to be diverted from the catalyst bed. The means 32 is connected to the base of the plate 26 and thus allows the liquid flow to be diverted. The means 31 and 32 discharge downstream from the granular bed 22 and upstream from the second distribution plate 41. The movable pieces 43 and 44 must be dimensioned such that the "floating" force of these pieces in the gas and the liquid corresponds to the force resulting from the same threshold differential pressure for a given ratio of the gas/liquid flow rate. In this way, when the bed begins to clog, the gas and liquid flow is diverted with the same ratio of the gas/liquid flow rate. The system can thus operate until there is complete clogging of the granular bed 22. At this instant, the two plates are connected to one another.

Figure 3:
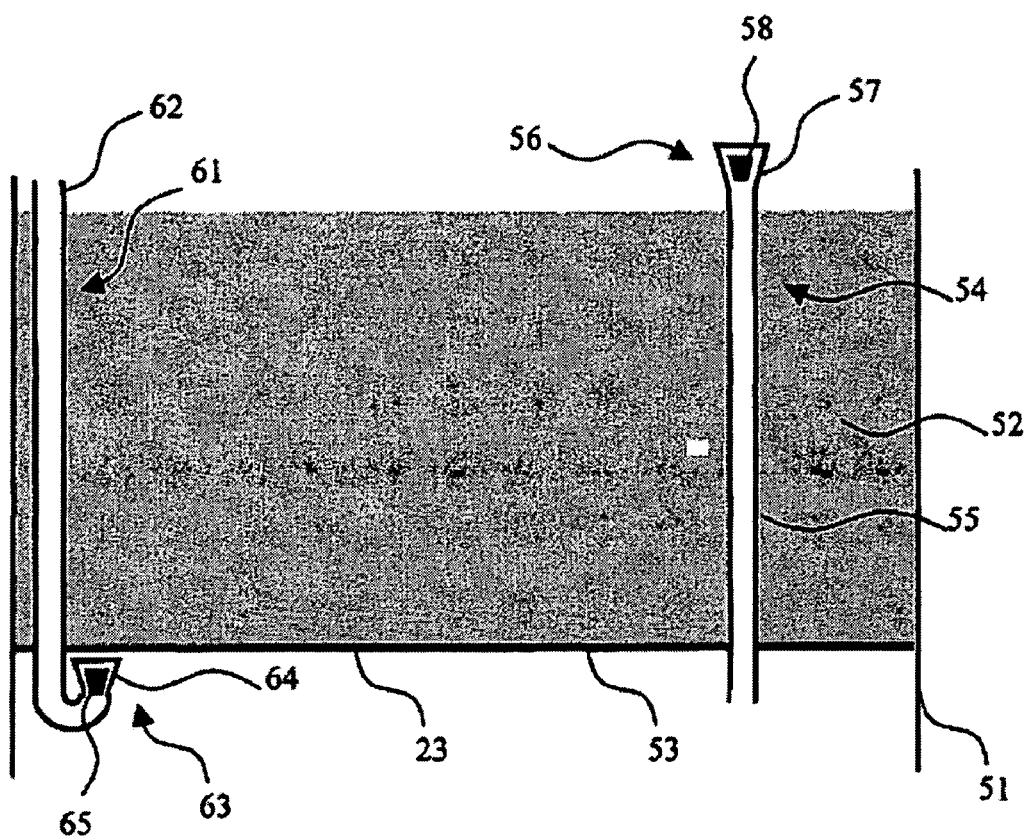
FIG. 3 shows, in a nonlimiting manner, still another embodiment corresponding to a countercurrent flow of gas and liquid.

FIG. 3 shows one embodiment corresponding to a countercurrent flow of the gas and liquid.

The illustrated device includes an enclosure 51, shown in part, in which there is a granular bed 52. This bed is composed of all the solid particles retained by a support grid 53.

A bypass means 54 makes it possible to divert an upward gaseous or liquid flow. The bypass means includes a pipe 55 whose top end is connected to a valve 56 allowing the opening of the pipe to be blocked or progressively allowing passage to a flow. The valve 56 includes a truncated cone part 57 whose orifice with the smallest cross-section is connected to the top end of the pipe 55, and a movable piece 58 mounted in said truncated cone in such a manner as to allow displacement between a closed position and a maximum open position. Let us observe that in this case the orientation of the truncated conical part and the weight of the movable piece are inherent in the return means acting by the sole force of gravity. Let us likewise observe that the top part of the pipe does not have to be bent at an angle.

A bypass means 61 allows a use for diverting a downward flow. The bypass means 61 includes a pipe 62 whose bottom end is connected to a valve 63 allowing the opening of the pipe to be blocked or progressively allowing passage to a flow. The valve 63 includes a truncated cone part 64 whose orifice with the smallest cross-section is connected to the top end of the pipe 62 and a movable piece 65 mounted in said truncated cone in such a manner as to allow displacement between a closed position and a maximum open position. As for the bypass means 54, the orientation of the truncated part and the weight of the movable piece are inherent in the return means acting by the sole force of gravity. In contrast to the bypass means 54, the bottom end of the pipe 62 to which the valve 63 is attached must be bent at an angle to correctly orient the truncated part 64.

When the flow is in countercurrent with respect to gas and liquid, the system shown remains usable. For example, in the case in which the granular bed is crossed by a downward flow of liquid and a rising flow of gas, the bypass means 64 is used to divert the liquid flow at the instant of clogging of the bed, and the bypass means 54 is used to divert the upward gas flow.

FIG. 4 shows one embodiment of the valve of the bypass means of the device of the invention. Only the valve 101 and the lower part 102 of the pipe of the bypass means are shown.

The valve 101 comprises a truncated conical part 103 whose orifice having the smallest cross-section is connected to the bottom end of the lower part 102 of the pipe of the bypass means. A movable piece 104 is mounted in the truncated conical part 103 in such a manner as to allow displacement between a closed position and a maximum open position. The top end of the truncated conical section is closed by a grid 105 that allows the flow to pass, but prevents the evacuation of the movable piece. This grid is especially useful when it produces a sudden and instantaneous rise of the pressure, for example due to an error in the control of operating conditions.

In this embodiment, the movable piece 104 has the shape of a truncated cone to which grooves can be added to facilitate flow around said piece and to make its movement more stable. The dimensions of the movable piece are such that the latter cooperates, in the closed position, with the internal surface of the truncated conical part 103 to allow good watertightness.

As and when the flow rate increases through the bypass means, the movable piece rises to allow a larger passage section to the flow in such a way as to maintain the ratio $$\frac{A}{Ao} * \frac{Q}{Qo}$$

between 0.1 and 10, A and Q corresponding to the passage section and to the flow rate through the valve, respectively, Ao and Qo corresponding respectively to the nominal passage section and to the nominal flow rate of said valve.

FIG. 5 shows a second embodiment of the valve of the bypass means of the device of the invention. Similarly to the representation in FIG. 4, FIG. 5 shows a valve 201 and the lower part 202 of the pipe of the bypass means. The valve 201 includes a truncated conical part 203 whose orifice with the smallest cross-section is connected to the bottom end of the lower part 202 of the pipe of the bypass means. The valve includes a movable piece 204 that is mounted in the truncated conical part 203. The top end of the truncated conical section is closed by a grid 205.

In this embodiment, the movable piece 204 has the shape of a ball. The dimensions of the movable piece are such that the latter cooperates in the closed position with the internal surface of the truncated conical part 203 to allow good watertightness.

FIG. 6 shows a third embodiment of the valve of the bypass means of the device of the invention. Only the valve 301 and the lower part 302 of the pipe of the bypass means are shown.

The valve 301 includes one plate 303 that is mounted to be able to move around one axis 304 on the bottom end of the lower part 302 of the pipe of the bypass means. The mounting is done in such a way as to allow displacement between a closed position and a maximum open position, the positioning of said plate being dependent on the fluid flow rate in the bypass means.

The valve 301, moreover, includes a return means acting on the plate for moving it toward the closed position during which the plate blocks the end of the pipe. In this embodiment, the return means includes a rod 305 in the extension of the plate 303 and a mass 306 that is located on the free end of the rod 305 and that acts as a counterweight relative to the axis 304 of mobility of the plate.

The axis 304 may be implemented by a spring.

Figure 7:
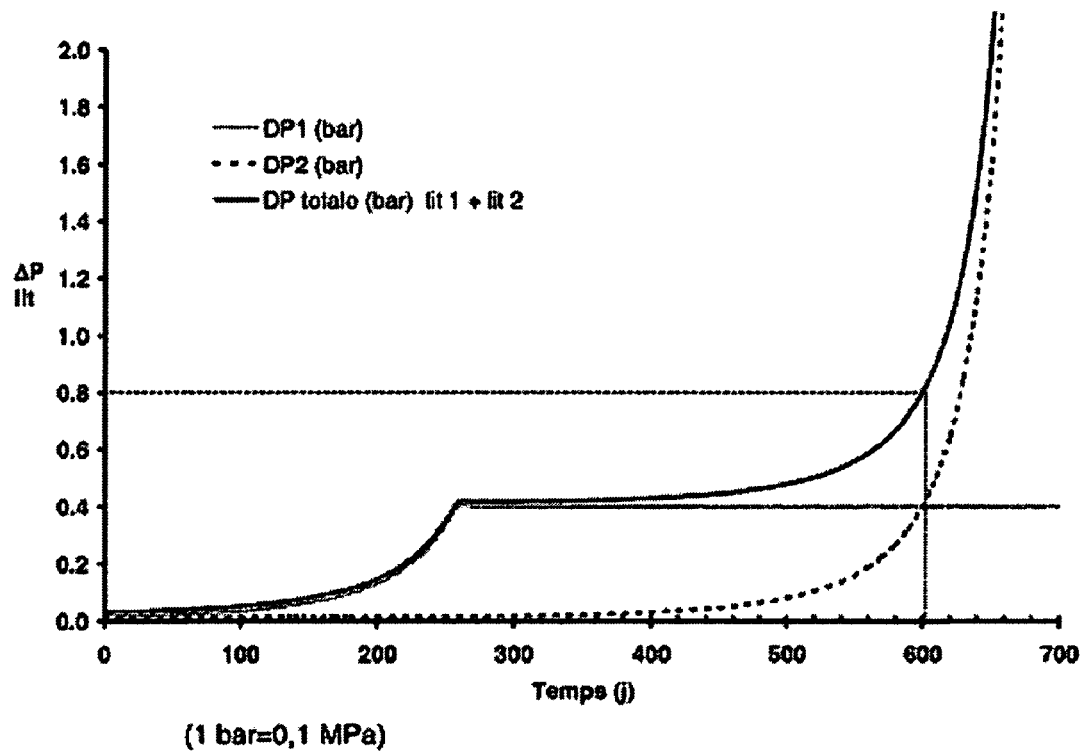
FIGS. 7 to 9 show, within the framework of the examples, as a function of time, the development of the differential pressure through each bed, DP1 and DP2, and the total differential pressure DP1+DP2 of a device with two solid particle beds.
Figure 8:
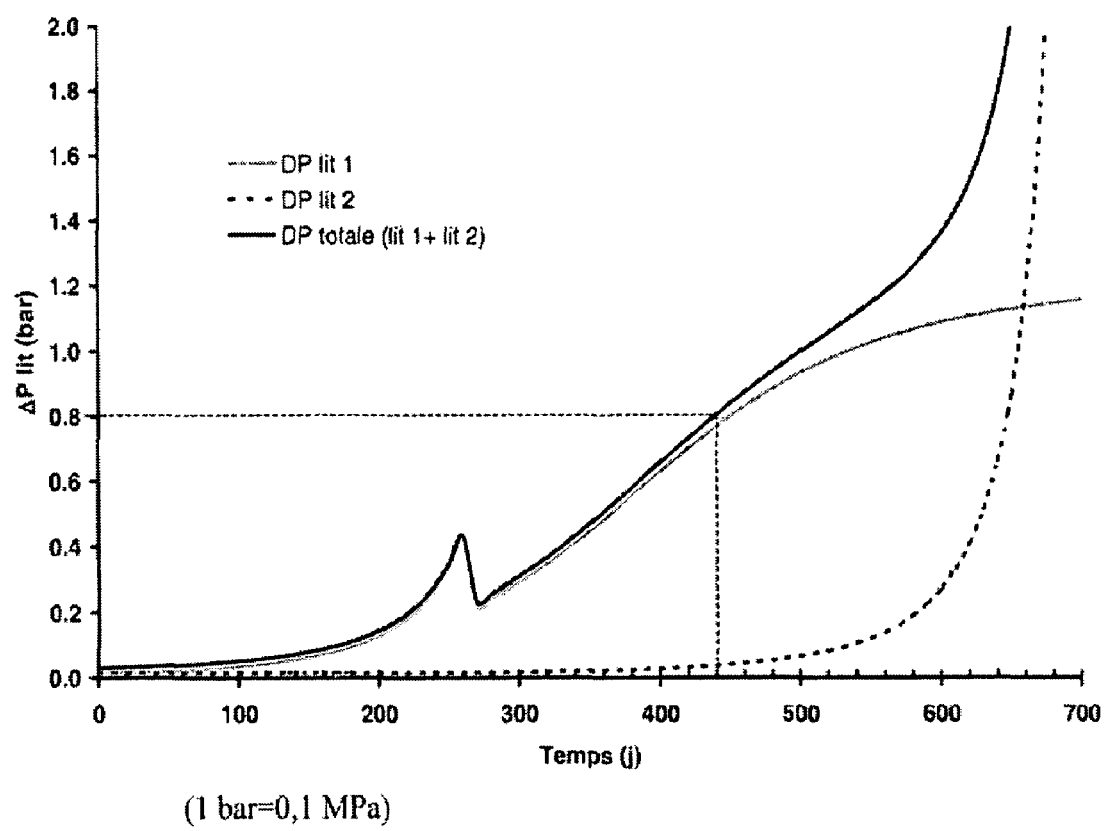
Figure 9:
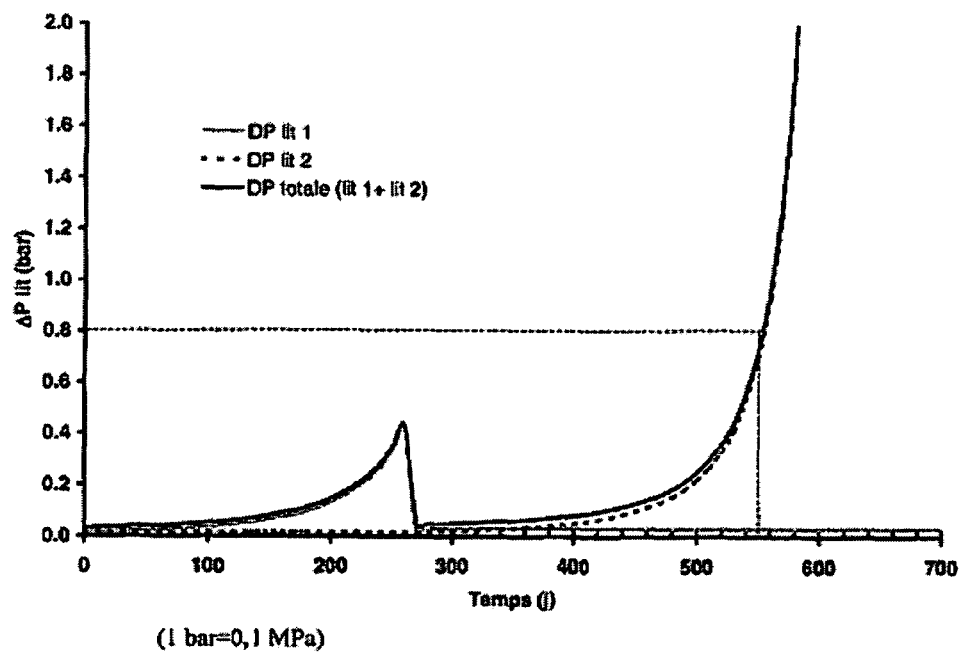

FIGS. 7 to 9 are described within the framework of examples.

EXAMPLES

These application examples have been produced by calculation in order to compare the device of the invention to a device of the prior art using bypass means equipped with rupture disks.

The example corresponds to the use of a catalytic reactor in which there are two successive beds, each with a height of 1 meter. The reactor with a diameter equal to 1 meter is traversed by a downward gas flow. The kinetics of deposition of clogging particles is taken into account in the form of a linear variation of the thickness of the deposit as a function of time and of the flow rate. The characteristics of the bed and the gas are described in Table 1 below.

TABLE 1

| | |
|---|---|
| Diameter of the Particles (m) | 0.002 |
| Porosity of the Bed (%) | 41 |
| Volumetric Mass of the Gas (kg/m3) | 15 |
| Dynamic Viscosity of the Gas (Pa · s) | 0.00002 |
| Surface Velocity of the Gas (m/s) | 0.1 |

In the case of the bypass system of the prior art, a series of bypass means equipped with rupture disks are arranged through the 1 st bed. These bypass means are dimensioned to divert 42 or 100% of the gas flow when the threshold differential pressure is reached, i.e., the pressure initiating the opening of the rupture disks.

In the case of the system according to the invention, a series of bypass means is arranged through the 1 st bed. Each of these bypass means includes a valve comprising a tubular, truncated conical part within which there is a movable truncated conical piece designed to move between a closed position and an open position. The movable piece is dimensioned to be raised by the force of a threshold differential pressure of 0.04 MPa (1 bar=0.1 MPa).

The development of the differential pressure through each bed, DP1 and DP2, and the total differential pressure, DP1+DP2, are shown as a function of time in FIGS. 7 to 9.

FIG. 7 corresponds to the development of the differential pressures in the case of a device according to the invention comprising 1 bypass tube with a diameter equal to 2 inches (2"; 1"=2.54 cm).

FIGS. 8 and 9 correspond to the development of differential pressures in the case of the device of the prior art equipped with rupture disks with the same threshold differential pressure as that of the device according to the invention. The device of FIG. 8 is dimensioned so as to divert 42% of the gas flow when the threshold differential pressure is reached; it includes 1 bypass tube with a diameter of 1" that is equipped with a rupture disk. The device of FIG. 9 is dimensioned in such a manner as to divert 100% of the gas flow when the threshold differential pressure is reached; it includes 1 bypass tube with a diameter of 1.5" (3.81 cm) that is equipped with a rupture disk.

The time scale of FIGS. 7 to 9 depends directly on the kinetics of clogging that is the same in the case according to the invention and in the case according to the prior art. Thus, the use of the same kinetics of clogging allows direct comparison of the device according to the invention with that of the prior art.

In the case of the device according to the invention, it is observed (cf. FIG. No. 7) that the differential pressure in the 1st bed upstream, DP1, increases rapidly until the differential pressure threshold of 0.04 MPa is reached, starting from which the movable piece of the valve begins to move from the closed position toward the open position.

The differential pressure DP1 is then kept constant due to the progressive increase of the passage section of the valve and of the flow rate through this valve.

From the opening of the valve of the bypass means of the 1st bed, the 2nd bed that is located downstream relative to the flow begins to progressively clog. A progressive increase of the differential pressure DP2 through the 2nd bed thus follows.

In the case of the device according to the prior art (cf. FIGS. 8 and 9), the differential pressure DP1 through the 1st bed increases in the same way as far as the threshold differential pressure of 0.04 MPa (1 bar=0.1 MPa).

Then, a sudden drop of the differential pressure is observed due to the sudden opening of the rupture disk, and the differential pressures DP1 and/or DP2 through the 1st and 2nd bed respectively continue to increase. In the case in which only 50% of the flow rate is diverted when DP1 is equal to 0.04 MPa (cf. FIG. 8), the differential pressures DP1 and DP2 increase at the same time. In the case in which 100% of the flow rate is diverted to the opening of the rupture disk (cf. FIG. 9), only the differential pressure DP2 increases, the differential pressure DP1 remaining constant and equal to the differential pressure in the bypass tube.

if it is considered that the maximum differential pressure that can be accommodated by the catalyst beds is 0.08 MPa, it is possible to determine for each case of the figure what the durations of the cycle are beyond which the clogged beds must be renewed. This maximum differential pressure likewise corresponds to the value beyond which the reactor can no longer be operated. This value is generally dictated by the maximum pressure of the compressor.

In the absence of any bypass means, the duration of the cycle, i.e., the instant starting from which the differential pressure dangerously exceeds 0.08 MPa, is 290 days. This duration of the cycle is determined by extrapolation of the DP1 curve of FIG. 7.

In the same way, the duration of the cycle for the device according to the prior art can be determined based on FIGS. 8 and 9. In the case in which only 50% of the flow rate is diverted when DP1 is equal to 0.4 MPa (cf. FIG. 8), the duration of the cycle is 440 days. In the case in which 100% of the flow rate is diverted to the opening of the rupture disk (cf. FIG. 9), only the differential pressure DP2 increases, and the duration of the cycle is 555 days.

In the case of a device according to the invention, the duration of the cycle can be determined based on FIG. 7. The duration of the cycle in the case of the invention is 600 days; this allows uninterrupted operation from 45 to 160 days more than with a device according to the prior art, and 310 days more than with a device without the bypass means.

The use of this invention allows a gain to be obtained in terms of the duration of operation of from 17% to 180% more than that obtained with a device of the prior art.

The invention claimed is:

1. A device for circulation of a gaseous fluid, a liquid fluid, or both, through at least one solid particle bed, said device comprising:
    at least one solid particle bed and at least one bypass device for bypassing the flow of gaseous fluid or liquid fluid through at least one part of a solid particle bed, said bypass device comprising:
    a pipe having a top end, which is positioned in an upper region above the upper surface of said solid particle bed, and a bottom end, which is positioned in a lower region below said upper surface of said solid particle bed, and
    a valve having a passage section for the flow of gaseous or liquid fluid, wherein said valve can be actuated into an open position, when the differential pressure through said solid particle bed is greater than a predetermined value, to permit the flow of gaseous or liquid fluid through said passage section,
    wherein said valve comprises:
    a widened tubular part containing said passage section, said widened tubular part having one orifice with the largest cross-section and another orifice with the smallest cross-section, and said orifice with the smallest cross-section is connected to the top end or the bottom end of said pipe of the bypass device,
    a movable piece mounted in said widened tubular part, wherein said movable piece can move between a closed position and a maximum open position, the positioning of the movable piece being dependent on the fluid flow rate in said widened tubular part, said movable piece providing automatic variation of the passage section in said valve based on the fluid flow rate, and
    a return means acting on the movable piece to move it toward the closed position in which the movable piece blocks the orifice of the widened tubular part with the smallest cross-section.

2. A device according to claim 1, wherein A is the area of the passage section of the valve and Q is the fluid flow rate though said valve, and A and Q vary in such a way that the ratio $$\frac{A}{Ao} * \frac{Q}{Qo}$$

is between 0.1 and 10, wherein Ao and Qo correspond to the nominal area of the passage section and to the nominal flow rate through the valve, respectively.

3. A device according to claim 1, wherein the return means acts by the force of gravity on the movable piece.

4. A device according to claim 1, wherein the return means comprises a spring.

5. A device according to claim 1, wherein the widened tubular part has the shape of a truncated cone and the movable piece has the shape of a ball.

6. A device according to claim 1, wherein the bottom end of said pipe of the bypass device is positioned in a region below said solid particle bed.

7. A device according to claim 1, wherein the bottom end of said pipe of the bypass device is positioned in a region below said solid particle bed, said bottom end is equipped with means for preventing the passage of solid particles into said pipe.

8. A device according to claim 7, wherein said means for preventing the passage of the solid particles into said pipe includes a cage having perforated walls, and said cage closes the bottom end of said pipe.

9. A device according to claim 1, further comprising a distribution plate on top of said solid particle bed, said distribution plate comprising a plate above which a liquid fluid can accumulate, and the top end of said pipe is positioned above the upper surface of said plate.

10. A device according to claim 1, further comprising a distribution plate on top of said solid particle bed, said distribution plate comprising a plate above which a liquid fluid can accumulate, and the top end of said pipe is at the same level as the upper surface of the plate of said distribution plate.

11. A device according to claim 9, wherein the top end of said pipe is at a height H above the upper surface of the plate of said distribution plate.

12. A device according to claim 9, wherein said device comprises at least two of said bypass devices, and said device further comprises a distribution plate on top of said solid particle bed, said distribution plate comprising a plate above which a liquid fluid can accumulate, wherein:
the top end of said pipe of at least one bypass device is positioned above the upper surface of said plate, and
the top end of said pipe of another bypass device is at the same level as the upper surface of the plate of said distribution plate.

13. A device according to claim 1, wherein a gaseous fluid and a liquid fluid circulate in countercurrent through at least one solid particle bed.

14. A device according to claim 1, wherein said device contains a plurality of solid particle beds, and at least one of said beds is equipped with at least one of said bypass devices.

15. A bypass device according to claim 1, wherein the widened tubular part has the shape of a truncated cone and the movable piece has the shape of a truncated cone.

16. A device according to claim 1, wherein said device contains a plurality of solid particle beds, and more than one of said beds is equipped with at least one of said bypass devices.

17. A device according to claim 1, wherein the orifice with the largest cross-section is positioned above the orifice with the smallest cross-section, and return means comprises the weight of the movable piece and the force of gravity thereon.

18. A device according to claim 1, further comprising a distribution plate above said solid particle bed, said distribution plate comprising a plate above which a liquid fluid can accumulate, and the top end of said pipe is positioned at a height H above the upper surface of said plate, and said pipe is adapted so that liquid fluid flow through said bypass device will begin immediately when the level of accumulated liquid on said plate exceeds said height H.

19. A device for circulation of a gaseous fluid, a liquid fluid, or both, through at least one solid particle bed, said device comprising:
at least one solid particle bed and at least one bypass device for bypassing the low of gaseous fluid or liquid fluid through at least one part of a solid particle bed, said bypass device adapted to provide, after a set threshold differential pressure through the at least one solid particle bed is exceeded, continuous regulation of the flow rate of fluid there through and/or continuous regulation of the differential pressure throughout the at least one solid particle bed, said bypass device comprising:
a pipe having a top end, which is positioned in an upper region above the upper surface of said solid particle bed, and a bottom end, which is positioned in a lower region below said upper surface of said solid particle bed, and
a valve having a passage section for the flow of gaseous or liquid fluid, wherein said valve can be actuated into an open position, when the differential pressure through said solid particle bed is greater than a predetermined value, to permit the flow of gaseous or liquid fluid through said passage section,
wherein said valve comprises:
a widened tubular part containing said passage section, said widened tubular part having one orifice with the largest cross-section and another orifice with the smallest cross-section, and said orifice with the smallest cross-section is connected to the top end or the bottom end of said pipe of the bypass device,
a movable piece mounted in said widened tubular part, wherein said movable piece can move between a closed position and a maximum open position, the positioning of the movable piece being dependent on the fluid flow rate in said widened tubular part, said movable piece providing automatic variation of the passage section in said valve based on the fluid flow rate, and
a return means acting on the movable piece to move it toward the closed position in which the movable piece blocks the orifice of the widened tubular part with the smallest cross-section.

* * * * *

UNITED STATES PATENT AND TRADEMARK OFFICE
CERTIFICATE OF CORRECTION

| | |
|---|---|
| PATENT NO. | : 7,521,027 B2 |
| APPLICATION NO. | : 11/236693 |
| DATED | : April 21, 2009 |
| INVENTOR(S) | : Boyer et al. |

It is certified that error appears in the above-identified patent and that said Letters Patent is hereby corrected as shown below:

On the Title page, Item (75) Inventors: Line 2 reads: "Abdelhakim Koudil, Lyons (FR)" should read --Abdelhakim Koudil, Lyon (FR)--.

On the Title page, Item (73) Assignee: Line 1 reads: "Institut Francais Due Petrole" should read --Institut Francais du Petrole--.

Column 12, Line 11, Claim 19, reads: "for bypassing the low of gaseous fluid or liquid fluid" should read --for bypassing the flow of gaseous fluid or liquid fluid--.

Signed and Sealed this
Twenty-eighth Day of February, 2012

David J. Kappos
*Director of the United States Patent and Trademark Office*